United States Patent [19]

Gagnon et al.

[11] Patent Number: 4,866,143

[45] Date of Patent: Sep. 12, 1989

[54] NOVEL SURFACTANTS BASED ON POLY(ALKYLENE CARBONATE)S

[75] Inventors: Steven D. Gagnon, Detroit; Edward M. Dexheimer, Grosse Ile, both of Mich.

[73] Assignee: BASF Corporation, Parsippany, N.J.

[21] Appl. No.: 184,585

[22] Filed: Apr. 21, 1988

[51] Int. Cl.$^4$ .............................................. C08L 71/02
[52] U.S. Cl. ................................... 525/409; 252/351; 525/461; 525/523; 527/300; 528/405; 558/265
[58] Field of Search ....................... 525/409, 461, 523; 252/351; 528/370, 405; 527/300; 558/265

[56] References Cited

U.S. PATENT DOCUMENTS

| | | | |
|---|---|---|---|
| 4,634,743 | 1/1987 | Prier | 525/462 |
| 4,663,399 | 5/1987 | Peters | 525/462 |
| 4,665,136 | 5/1987 | Santangelo et al. | 525/523 |
| 4,686,273 | 8/1987 | Harris | 528/196 |
| 4,686,274 | 8/1987 | Harris et al. | 528/196 |
| 4,686,276 | 8/1987 | Myers | 528/371 |
| 4,745,162 | 5/1988 | Harris | 525/461 |
| 4,812,530 | 3/1989 | Priddy et al. | 525/409 |

*Primary Examiner*—Theodore E. Pertilla
*Attorney, Agent, or Firm*—Bill C. Panagos

[57] ABSTRACT

A polyether polycarbonate block copolymer nonionic surface-active agent and method for making the same. The polyether polycarbonate surface active agent is comprised of a hydrophilic portion comprised of a polymer selected from the group consisting of a polyoxyalkylene polyether, a saccharide, a saccharide polyoxyalkylenate, a polycarbonate having a carbon dioxide content of from about 1 to 15 molar percent and mixtures thereof and a hydrophobic portion comprising alkylene and carbonate units arranged in alternating or random order to form a poly(alkylene carbonate) having a total carbon dioxide content of from about 25 to 50 molar percent and a total molecular weight of from about 300 to 10,000. The hydrophobic portion is bonded to the hydrophilic portion at each side of a reactive hydrogen. The surface active agent is prepared by polymerizing the hydrophilic portion with the hydrophobic portion in a weight ratio of about 10:90 to 90:10.

4 Claims, No Drawings

NOVEL SURFACTANTS BASED ON POLY(ALKYLENE CARBONATE)S

BACKGROUND OF THE INVENTION

1. Field of the Invention

The present invention relates to navel surfactants based on poly(alkylene carbonate)s. The surfactants of the present invention are polyether polycarbonate block copolymer nonionic surface active agents comprising a hydrophilic portion comprised of a polymer selected from the group consisting of polyoxyalkylene polyethers, saccharides, polyoxyalkylene saccharides, and a hydrophobic portion comprised of alkylene and carbonate units arranged in alternating or random order. The hydrophobic portions are bonded to the hydrophilic portion at the site of each reactive hydrogen atom to form the surfactants of the present invention.

2. Description of the Prior Art

Prier, U.S. Pat. No. 4,634,743, relates to block copolymers useful in the preparation of polyurethanes. The polyether polycarbonate block copolymer of Prier is comprised of the residue of a hydrocarbon containing three or more functional groups with active hydrogens, an alkylene polyether, polyamine or amide, polyaromatic carbonate, with a polyether polycarbonate having ether units and carbonate units arranged in random order wherein the polyether polycarbonate blocks are bonded to the alkylene polyether, polyamine, polyamide or polyaromatic carbonate. The copolymers of Prier are useful in the preparation of polyurethane plastics.

Prier differs from the present invention because the present invention relates to polyether polycarbonate block copolymers which have surface active properties and which contain ether carbonate units arranged in alternate or random order. Moreover, Prier fails to appreciate the critical role of carbon dioxide in the properties of polycarbonates. The carbon dioxide content of the polycarbonate is determined by reaction conditions chosen and the nature of the catalysts used to initiate the reactions. Prier does not claim both low molecular weight poly(alkylene carbonate)s having a molecular weight of about 300 to 10,000 and a $CO_2$ content of greater than 30 percent. Rather, Prier forms molecules having a molecular weight range of about 50,000 to 100,000.

Inoue et al, U.S. Pat. No. 3,585,168, discloses a reaction of alkylene oxides, specifically ethylene oxide, propylene oxide or mixtures thereof, with carbon dioxide in the presence of a catalyst to form polycarbonates containing ether linkages. The polycarbonate formed has a molecular weight of from between 10,000 and 200,000 and usually between 20,000 and 50,000.

Inoue et al, differ from the present invention because Inoue et al do not contemplate the use of a polyfunctional initiator such as is used in the present invention. Further, the Inoue composition is not water soluble and has no surface active properties. It is used for molding articles having either a rigid or slight elastic structure. Accordingly, the present invention differs from Inoue et al.

Stevens, U.S. Pat. No. 3,248,415, relates to a process for the manufacture of high molecular weight polycarbonates from carbon dioxide and 1,2-epoxides such as ethylene oxide and propylene oxide to yield polycarbonates having a molecular weight of from 700 to 5000. Carbon dioxide and an epoxide are polymerized according to Stevens to yield the polycarbonates. The copolymerization occurs by virtue of the presence of a small controlled concentration of an organic compound having at least 2 and usually 2 to 4 active hydrogens such as a polyhydric alcohol or glycol. The copolymerization occurs at elevated temperatures, super atmospheric pressure and preferably under the conditions of base catalysis.

Stevens does not contemplate forming a polyether polycarbonate surface active agent having alternating carbon dioxide and ether linkages in the polycarbonate hydrophobic block nor does he contemplate a polyether polycarbonate block copolymer surfactant. Accordingly, the present invention differs from Stevens.

Dixon, U.S. Pat. No. 4,137,280, discloses end-capping of hydroxyl groups in a poly(alkylene carbonate) to enhance thermal stability. The polycarbonates formed according to Dixon are made by reacting alkylene oxides such as ethylene oxide and propylene oxide with carbon dioxide; no reference is made to making block copolymers. Dixon differs from the present invention because the resulting repeating structure differs greatly from that proposed in the present invention.

Cuscurida et al, U.S. Pat. No. 4,488,982, disclose low foaming nonionic polyether polycarbonate surfactants and functional fluids. The surfactants and functional fluids of Cuscurida are prepared ty reacting a monofunctional initiator with an alkylene carbonate or with an alkylene oxide and carbon dioxide to form polyether polycarbonate materials. When surfactants are produced, they exhibit reduced foaming characteristics as compared to other nonionic surfactants. In terms of viscosity, flashpoints and pour points, the polycarbonates of Cuscurida et al are useful as functional fluids.

Reference is made in Cuscurida to Stevens, U.S. Pat. Nos. 3,248,414; 3,248,415; and 3,248,416 to indicate the method whereby the polyether polycarbonate surfactants are formed. The synthesis routes of Stevens only provide low $CO_2$ content polycarbonates. Thus, the configuration of Cuscurida presumably resembles the configuration of the polyether polycarbonate materials disclosed in Stevens. Further, Cuscurida does not mention either ABA block copolymer structures, nor surfactants terminated by a hydrophile. Accordingly, the materials of Cuscurida are different than the recurring units of the present invention.

Dixon et al, U.S. Pat. Nos. 4,104,264 and 4,066,630, relate to the thermal stability of a polycarbonate which is improved by capping terminal hydroxyl groups with, in the case of the '630 patent, a compound capable of forming a carbon-oxygen bond, and, in the case of the '264 patent, with any compound capable of forming an oxygen-sulfur bond. The polycarbonates are formed from carbon dioxide and an alkylene oxide. There is no initiator such as is present in the instant invention and consequently the molecular weight is very high. In the '264 patent, the disclosed molecular weight of the polycarbonate which is formed is open ended whereas in the '630 patent, the polycarbonates are those having a molecular weight in excess of 22,000. The polymers are intended for use as resins and molding products. No reference is made to copolymers containing hydrophilic blocks.

The present invention is not concerned with the thermal stability of polycarbonate groups by capping terminal hydroxyl groups. Rather, the present invention is a polyether polycarbonate surface active agent. Accordingly, the present invention differs from the Dixon et al, patents.

Stevens, Great Britain Patent Nos. 828,523; and '524 disclose polycarbonates prepared by heating a mixture of aliphatic or cycloaliphatic 1,2-epoxides, carbon dioxide and an organic compound having two or more hydrogens as the initiator, using an alkaline catalyst, such as potassium carbonate. This route leads to low molecular weight, low $CO_2$ content polycarbonates. No mention is made of copolymerization to add a hydrophile. These polycarbonates are used to prepare materials useful in insulation and upholsteries. The present invention is not directed to the use of polycarbonates for insulation and upholstery foams. Accordingly, the present invention differs from the Stevens' references.

Stevens, U.S. Pat. No. 2,787,632, discloses linear low molecular weight polycarbonates possessing terminal hydroxyl groups and averaging between 800 and 5000 in molecular weight. Stevens prepares the polycarbonates by conducting ester interchange between a saturated acyclic diol and a diester of carbonic acid. Metallic sodium or other catalysts are used. The reaction temperature is from between 140° to 200°. The polycarbonates so formed can be free flowing liquids, viscous syrups or solids depending upon molecular weight and hydroxyl number. Those skilled in the art recognize that Stevens made a low $CO_2$ content polycarbonate, although actual $CO_2$ content was never reported. The present invention produces a relatively high $CO_2$ content. This results in a substantially different molecule than that disclosed in Stevens. Accordingly, the present invention differs from Stevens.

Rajan, U.S. Pat. No. 4,456,745, discloses polyurethanes prepared from polycarbonates. The polycarbonates which form the polyurethanes are prepared by heating cyclic carbonates in the presence of cationic initiators such as Lewis acid catalysts. Under reaction conditions, the carbonates form a polycarbonate glycol or diol which, when heated with polyisocyanates, is useful in reaction injection molding applications. Accordingly, the present invention differs from Rajan.

Ammons, U.S. Pat. No. 4,024,113, discloses polycarbonates which are useful for making shock absorbing fluids and laminates in automobile windshields. Ammons differs from the present invention because Ammons excludes ethylene and propylene oxides for use in forming the polycarbonates whereas they are the epoxides of choice of the present invention. Accordingly, the present invention differs from Ammons.

Stevens, Great Britain Patent No. 820,603, discloses heating a cyclic glycol carbonate with a polyhydric alcohol to produce products useful in molding compositions. Accordingly, the compositions are useful as impregnates for woven fabrics and coatings for glass and polyethylenes.

Hostetler et al, U.S. Pat. No. 3,305,605, disclose compositions containing polycarbonate polymers as plasticizers and functional fluids. The polymers of Hostetler are prepared by the polymerization reaction of at least one cyclic carbonate monomer in contact with a catalyst such as an alkali earth metal. No reference is made to block copolymers nor the incorporation of hydrophilic blocks. Accordingly, the present invention differs from Hostetler.

Santangelo et al, U.S. Pat. No. 4,665,136, disclose a class of block copolymers and a process for making them. The process comprises reacting an alkylene oxide with $CO_2$ in an organic solvent in the presence of an organometallic catalyst to form a poly(alkylene carbonate). A second alkylene oxide is subsequently added without a catalyst. The resulting product is a block copolymer comprising distinct, covalently linked, alkylene carbonate blocks. Santangelo et al differ from the present invention because there is no showing of using the product as a surfactant. Further, as can be seen by examining the structure of Santangelo et al, it is clear that it is not within the molecular weight range of the present invention. Accordingly, the present invention differs from Santangelo et al.

Meyers, U.S. Pat. No. 4,686,276, disclose an improved process for the preparation of poly(alkylene carbonate)s polymers. The process comprises the reaction of alkylene oxide with carbon dioxide and/or an alkylene carbonate at elevated temperature and pressures. The improvement comprises a special catalyst which is an alkaline catalyst and a stannate compound. The process forms only the polycarbonate hydrophobe of the instant invention and the catalyst system is specifically designed to provide a $CO_2$ content below the range of the instant invention. Accordingly, the present invention differs from Meyers.

Harris et al, U.S. Pat. Nos. 4,686,273 and 4,686,274 disclose a process for modifying by increasing the molecular weight of poly(alkylene carbonate) polyols. The method is a transesterification process whereby the final product does not have ABA or even a (AB)n configuration. Rather, during he process, the order of the hydrophobe and hydrophiles is scrambled. This transesterification results in a random cleavage of the hydrophobe with random insertion of the hydrophile. Although this molecule may be water soluble, it will not function as a surfactant. Accordingly, the present invention differs from Harris.

SUMMARY OF THE INVENTION

The present invention relates to polyether polycarbonate block copolymer nonionic surface active agents which are comprised of (a) a hydrophilic portion comprising a polymer selected from the group consisting of a polyoxyalkylene polyether, a saccharide, a polyoxyalkylene saccharide, a polycarbonate having a percent carbon dioxide content of from about 1 to 15 molar percent and mixtures thereof, and;

(b) a hydrophobic portion comprising alkylene and carbonate units arranged in alternating or random order, to form a poly(alkylene carbonate) hydrophobe having a total carbon dioxide content of from about 25 to 50 molar percent and an average molecular weight of from about 300 to 10,000.

The hydrophobic portion (b) is bonded to the polymer defined in (a) at each site of a reactive hydrogen atom in a weight ratio of 10:90 to 90:10.

This invention also relates to a method for preparing polyether polycarbonate block copolymer nonionic surface active agents. One method is to polymerize, at a temperature effective to polymerize, a hydrophilic portion comprised of a polymer selected from the group consisting of polyoxyalkylene polyether, a saccharide, a polyoxyalkylene saccharide, a poly(alkylene carbonate) having a percent carbon dioxide content of from about 1 to 15 molar percent, and mixtures thereof, with a hydrophobic portion comprised of alkylene and carbonate units arranged in alternating or random order to form a poly(alkylene carbonate) hydrophobe having total carbon dioxide content of from about 25 to 50 molar percent and an average molecular weight of from about 300 to 10,000. The hydrophobic portion is bonded to the hydrophilic portion at the site of each reactive hydrogen atom and the hydrophilic portion and hydrophobic portions are present in a weight ratio from about 10:90 to 90:10.

Another method is to polymerize the polycarbonate onto the polyether. Another method is to couple polyether and polycarbonate blocks using phosgene. Phosgene can be used to create the polycarbonate blocks from diols.

Another method comprises coupling a difunctional acid chloride with two molecules of a monofunctional poly(alkylene oxide) poly(alkylene carbonate) block copolymer to form the polyether polycarbonate block copolymers of the present invention.

It is therefore an object of this invention to synthesize polyether polycarbonate block copolymer surface active agents which contain a high percentage of $CO_2$ and are suitable for use in light detergent compositions, such as automatic dishwashing compositions.

It is also an object of this invention to arrive at a method for forming the polyether polycarbonate block copolymers having alkylene and carbonate units arranged in block or random order, whereby the $CO_2$ content is from about 25 to 50 molar percent and the average molecular weight of the poly(alkylene carbonate) hydrophobe is from about 300 to 10,000.

Other objects will become apparent to those skilled in the art by a reading of the specification, and it will become obvious that various modifications and improvements will be possible without departing from the scope and spirit of the disclosed invention.

DETAILED DESCRIPTION OF THE PREFERRED EMBODIMENT

The present invention is concerned with the manufacture of aliphatic polycarbonates polyols from oxirane compounds such as ethylene oxide, propylene oxide and mixtures thereof, carbon dioxide and an initiator such as an alcohol, diol, glycol or amine. The polycarbonate portion of the present invention is believed to have the repeating unit

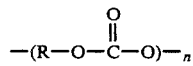

wherein R is selected from the group consisting of ethylene, propylene and mixtures thereof, and n is an integer such that the average molecular weight of the poly(alkylene carbonate) hydrophobe is from about 300 to 10,000.

The resulting polymers are inexpensive to manufacture because of the low cost of the initial ingredients, and have a structure similar to ABA polymers or AB polymers. The polyether polycarbonate block copolymer nonionic surfactant agents of the present invention are comprised of a hydrophilic portion which is a polymer selected from the group consisting of a polyoxyalkylene polyether, a saccharide, a saccharide oxyalkylate, a polycarbonate having a percent carbon dioxide content of from about 1 to 15 mole percent and mixtures thereof, and a hydrophobic portion which is comprised of alkylene and carbonate units arranged in alternating or random order, to form a poly(alkylene carbonate) having a total percent carbon dioxide content of from about 25 to 50 molar percent and an average molecular weight of poly(alkylene carbonate) hydrophobe of about 300 to 10,000. The hydrophobic portion is bonded to the hydrophilic portion of the polymer at each site of a reactive hydrogen atom in a ratio of 10:90 to 90:10 hydrophile to hydrophobe.

The polyoxyalkylene polyethers which are useful in the present invention are 1,2-monoepoxide compounds such as ethylene oxide, propylene oxide and mixtures thereof. The saccharides which are useful in the present invention are mono, oligo, and polysaccharides. These include glucose, sucrose, cellulose, starch and mixtures thereof. Polyoxyalkylene saccharides are also useful. These include oxyethylates of sorbitol, sucrose, and starch.

It also has been learned that polycarbonates having a percent carbon dioxide content of from about 0 to 15 molar percent will function as hydrophile: molecules and as such, are included as useful hydrophilic portions for polycarbonate block nonionic surfactant of the present invention. However, it should be noted that at a carbon dioxide content of higher than about 15 percent, the polycarbonate becomes hydrophobic and so cannot be included as a hydrophile.

The hydrophobic portion is comprised of alkylene and carbonate units arranged in random, but preferably in alternating order. The poly(alkylene carbonate)s so formed are preferably formed from an oxirane compound such as ethylene oxide, propylene oxide and mixtures thereof, carbon dioxide and a polyfunctional initiator having a least one and preferably more than one reactive hydrogen. Alkylene carbonates such as ethylene carbonate, propylene carbonate and mixtures thereof may be used instead of oxirane and carbon dioxide gas. Preferably, a polyfunctional initiator having 2 or more active hydrogens is utilized. Amines as well as alcohols, diols and triols are useful as initiators.

Amines which are useful in the present invention may be those selected from the group consisting of ethyl amine, diethyl amine, ethylene diamine, and mixtures thereof.

Alcohols such as those selected from the group consisting of methanol, ethylene glycol, glycerine, and phenol and mixtures thereof may also be used as polyfunctional initiators.

The hydrophobic portion is bonded to the hydrophilic portion at each site of a reactive hydrogen atom to form a surface active agent in a ratio of 10:90 to 90:10. The surface active agents preferably have an ABA block configuration. However, surface active agents may be formed with AB configurations, and mixtures of AB and ABA blocks. The configuration of the polymer formed is dependent upon the end use to which it will be applied.

The hydrophobic portion is preferably derived from one or more poly(alkylene carbonate)s and preferably may be poly(propylene carbonate) or poly(ethylene carbonate).

The polyether polycarbonate block copolymer nonionic surface active agents may be made in a number of different methods.

One method envisions polymerizing, at a temperature effective to polymerize, a hydrophilic portion comprised of a polymer selected from the group consisting of polyoxyalkylene polyesters, saccharides, saccharide oxyalkylates, and poly(alkylene carbonate)s having a percent carbon dioxide content of from 1 to 15 molar percent, and mixtures thereof, with a hydrophobic portion comprised of alkylene and carbonate units arranged in alternating or random order to form poly(alkylene carbonate)s having a repeating unit:

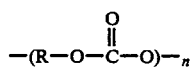

wherein R is selected from the group consisting of ethylene, propylene and mixtures thereof, and n is an integer such that the molecular weight of the polycarbonate unit is from about 300 to 10,000. The hydrophobic portion is bonded to the hydrophilic portion in a weight ratio of from about 10:90 to 90:10. Preferably, the poly(alkylene carbonate) is poly(propylene carbonate), poly(ethylene carbonate), and mixtures thereof.

Another method for preparing the polyether polycarbonate block copolymer surface active agent of the present invention is by oxyethylating, at a temperature of sufficient to promote oxyethylation, a poly(alkylene carbonate) having a total carbon dioxide content of from about 25 to 50 molar percent and an average molecular weight of about 300 to 10,000, in the presence of a catalytically effective amount of an oxyethylation catalysts at a temperature sufficient to promote oxyethylation in a weight ratio of about 10:90 to 90:10. The oxyethylation catalysts include those which are old and well known in the art such as sodium hydroxide and potassium hydroxide and mixtures thereof as well as new catalysts such as cobalt hexacyanecobaltate and diethylzinc, and mixtures thereof.

Discussed above are methods for synthesizing block copolymers by sequential addition of repeating units to form the final structure. Another method is to synthesize each block separately and then couple the blocks together to form the final structure. There are a number of standard procedures for coupling blocks together which are known to those skilled in the art. Specific examples are coupling with phosgene, acid halides of dicarboxylic acids such as adipoyl chloride, dihalosilanes such as dichlorodimethylsilane, and formation of acetals or metals.

One such method for producing the polyether polycarbonate block copolymer surface active agents of the present invention is comprised of adding α-alkyl-ω-hydroxypoly(ethylene oxide), at a temperature sufficient to promote said addition, to an α,ω-bischloroformate of a polyalkylene carbonate having a total percent carbon dioxide content of from about 25 to 50 molar percent and a molecular weight of from about 300 to 10,000 in a weight ratio of from about 10:90 to 90:10. The addition reaction is conducted preferably at a temperature range of about 0° to 45° C. Conversely an α-alkyl,ω-hydroxypoly(ethylene oxide) can be converted to its chloroformate and then added to a poly(alkylene carbonate) having a total carbon dioxide content of from about 25 to 50 molar percent and a molecular weight of from about 300 to 10,000.

Another method for producing a polyether polycarbonate block copolymer surface active agent according to the present invention, is comprised of coupling, at a temperature sufficient to promote the coupling, a difunctional acid chloride with two molecules of a monofunctional poly(alkylene oxide) with a poly(alkylene carbonate) having alkylene and carbonate moieties arranged in random or alternating order and a total percent carbon dioxide content of from about 25 to 50 molar percent and a molecular weight of from about 300 to 10,000 in a weight ratio of about 10:90 to 90:10. The difunctional acid chlorides may be those selected from the group consisting of malonic, succinic, glutaric, adipic, pimelic acid, and mixtures thereof.

The surface active agents formed according to this invention exhibit low foam generation, are biodegradable, lower the surface tension of water and improve wetting of particles and fabrics. The cloud point of the surface active agents formed according to the present invention may be adjusted over a wide range by varying the ratio of polycarbonate to hydrophile.

The following examples are offered to illustrate various properties of the nonionic surface active agents of the present invention. Those skilled in the art will understand that they are not to be construed as limiting the scope and spirit of the invention.

EXAMPLE 1

Comparison of Di-Block and Tri-Block Polyether Polycarbonates

Example 1, as shown in Table I, discloses a comparison of di-block and tri-block polyether polycarbonates and polyoxyethylene/polypropylene surfactants. The polyether polycarbonate surfactants of the present invention were compared with polyoxyethylene polyoxypropylene block copolymer surface active agents such as Pluronic® P-65 polyether and Pluronic® F-68 polyether. In terms of surface tension, all the materials tested had comparable surface tension properties. The surfactants all had acceptable cloud points and produced acceptable interfacial tension. However, polyether polycarbonate surfactants produced much less foam as measured by Ross-Miles foam height, thereby showing special promise for use in light detergents, such as dishwashing detergents, where low foam is desired. The data indicates that di-block and tri-block aliphatic polyether polycarbonates function as effective nonionic surface active agents.

EXAMPLE 2

Synthesis of a "Reverse Pluronic®"-Type Polycarbonate

A mixture of 1760 g (40 moles) ethylene carbonate, 10 g potassium stannate trihydrate, and 560 g (0.40 mole) PLURACOL® E-1450 poly(ethylene oxide) was heated at 160° C. for 5h. The reaction mixture was treated with 15 g MAGNESOL® magnesium silicate and 3.0 g water, heated at 95° C. for 1h, and filtered. Unreacted monomer (9%) was removed by vacuum stripping, leaving 1545 g of a polyether polycarbonate. The following properties were recorded for the polymer: hydroxyl number 59, cloud point 36° C. (at 1% concentration), surface tension 52 dynes/cm, and Ross-Miles foam height of 1 mm.

EXAMPLE 3

Synthesis of a 50% $CO_2$-Content ABA Polycarbonate Polyether

To an ice-cold solution of ethylene glycol bischloroformate (50.39 g) in 200 mL of methylene chloride was added pyridine (44.85 g) dropwise. After 15 minutes, ethylene glycol (18.40 g) was added dropwise. Upon warming to room temperature, the solution was diluted with 100 mL of chloroform and copper sulfate (16.07 g) added. The solution was filtered, washed successively with an 18 percent (w/v) aqueous copper sulfate solution and deionized water, then dried over anhydrous magnesium sulfate. Filtration and removal of volatile under reduced pressure gave 42.66 g of polyethylene carbonate as a light yellow viscous liquid. In another method of synthesis; to an ice-cold solution of phosgene (9.43 g) in 250 mL of methylene chloride was added pyridine (15.98 g) dropwise. After 5 minutes, a solution of Pluracol ® polyol E-1350M (115.77 g) in 100 mL of methylene chloride was added dropwise. After warming to room temperature, copper sulfate (20.02 g) was added. The solution was filtered, washed with deionized water, then dried over a mixture of anhydrous sodium sulfate and magnesium sulfate. Filtration and removal of volatiles under reduced pressure gave 84.49 g of α-methyl-ω-methoxypoly-(oxy-1,2-ethanediyl)-co-poly(ethylenecarbonate)-co-poly-(oxy-1,2-ethanediyl) as a light yellow waxy solid, with a molecular weight of 2574.

EXAMPLE 4

Synthesis of an Ester-Coupled ABA Polyether Polycarbonate

An AB polyether polycarbonate was prepared by polymerizing ethylene carbonate onto Pluracol ® E-1350M polyol. The 2300 MW polyether polycarbonate (470 g) was combined with 17.4 g pyridine and 2.3 L tetrahydrofuran (THF). A solution of 18.3 g of adipoyl chloride in 100 mL THF was added dropwise to the polycarbonate solution. After standing 72h at room temperature, THF was removed from the reaction mixture. Filtration of the concentrate gave 454 g of an ABA polyether polycarbonate. The cloud point at (1%/10%), was 68° C./63° C., and the surface tension was 48 dynes/cm.

EXAMPLE 5

Comparison of Tri-Block Polycarbonate Surfactants with a Tri-Block Polyoxypropylene Polyoxyethylene Block Copolymer.

Table II depicts the comparison of representative polyether polycarbonates of the present invention and a representative polyoxypropylene polyoxyethylene block copolymer. The surfactants were compared for cloud point, surface tension and foam height.

As can be seen, the cloud point of the polycarbonate surfactants were comparable to the polyoxypropylene polyoxyethylene surfactant. Similarly, surface tensions were comparable. However, it can be seen that the foam height was much less when using the polyether polycarbonates. Thus, the surfactants of the present invention are more effective in compositions requiring low foam characteristics, such as light detergents, among them automatic dishwashing compositions.

TABLE I

| PRORERTY | POLYCARBONATE PROPERTIES | | | | |
|---|---|---|---|---|---|
| | A | B | C | PLURONIC ® P-65 | PLURONIC ® F-68 |
| Surface Tension (dynes/cm) | 40.7 | 48.8 | 51.6 | 46.3 | 50.3 |
| Interfacial Tension (dynes/cm) | 9.1 | 18.0 | 21.4 | — | 19.8 |
| Cloud Point | 18/23 | 55/55 | 77/71 | 82/80 | >100/>100 |
| Foam Height (R-M, mm) | 0 | 0 | — | 70 | 35 |
| Viscosity (SUS) | 7902 | solid | 10536 | 1821 | solid |
| Molecular Weight | 2150 | 1968 | 2105 | 3400 | 8400 |

A = 2000 MW Poly(hexamethylene carbonate)-co-poly(ethylene oxide), 30% EO.
B = PLURACOL ® E-1350M Poly(ethylene carbonate). AB block copolymer
C = 1700 MW Poly(ethylene carbonate)-co-poly(ethylene oxide), 50% EO.
PLURONIC ® P-65 is a Trademark of BASF Corporation for a polyoxyethylene polyoxypropylene block copolymer, 50% EO.
PLURONIC ® F-68 is a Trademark of BASF Corporation for a polyoxyethylene polyoxypropylene block copolymer 80% EO.
R-M = Ross-Miles foam test

TABLE II

| | POLYCARBONATE PROPERTIES | | |
|---|---|---|---|
| Structure[1] | Cloud Point (1/10%) | Surface Tension (dynes/cm) | Ross-Miles Foam Height (mm) |
| ABA,[2] 2000 MW, 60% EO | 18/23 | 40.7 | 0 |
| BAB,[2] 2500 MW, 25% EO | >100/<0 | 54.6 | 0 |
| BAB,[3] 2000 MW, 50% EO | 69/59 | 50.9 | 10 |

Key
[1] A = hydrophile, B = hydrophobe
[2] Poly(alkylene carbonate) block copolymer surfactant
[3] PLURONIC ® 10R5 is a polyoxypropylene polyoxyethylene block copolymer surfactant having an average molecular weight of about 1950 and an oxyethylene content of about 50%.

The embodiments of the invention in which an exclusive privilege or property is claimed are defined as follows:

1. A polyether polycarbonate block copolymer nonionic surface-active agent, comprising:
    (a) a hydrophilic portion comprising a polymer selected from the group consisting of a polyoxyalkylene polyether, a saccharide, a polyoxyalkylene saccharide, a polycarbonate having a carbon dioxide content of from about 1 to 15 molar percent and mixtures thereof; and
    (b) a hydrophobic portion comprising alkylene and carbonate units arranged in alternating or random order to form a poly(alkylene carbonate), having a total carton dioxide content of from about 25 to 50 molar percent and a total molecular weight of from 300 to 10,000, said hydrophobic portion (b) bonded to the hydrophilic portion in (a) at each site of a reactive hydrogen atom in a ratio of from about 10:90 to 90:10.

2. The surface-active agent of claim 1, wherein the polyoxyalkylene polyether of (a) is polyethylene oxide.

3. The surface-active agent of claim 1, wherein (b) is derived from one or more poly(alkylene carbonate)s.

4. The surface-active agent of claim 3, wherein the poly(alkylene carbonate) is poly(ethylene carbonate).

* * * * *